United States Patent
Nackaerts (10) Patent No.: US 10,417,147 B2
(45) Date of Patent: Sep. 17, 2019

(54) BUFFER DEVICE, AN ELECTRONIC SYSTEM, AND A METHOD FOR OPERATING A BUFFER DEVICE

(71) Applicant: NXP B.V., Eindhoven (NL)

(72) Inventor: Axel Nackaerts, Haasrode (BE)

(73) Assignee: NXP B.V., Eindhoven (NL)

( * ) Notice: Subject to any disclaimer, the term of this patent is extended or adjusted under 35 U.S.C. 154(b) by 143 days.

(21) Appl. No.: 15/236,253

(22) Filed: Aug. 12, 2016

(65) Prior Publication Data
US 2018/0046590 A1 Feb. 15, 2018

(51) Int. Cl.
*G06F 3/06* (2006.01)
*G06F 12/0831* (2016.01)
*G06F 13/16* (2006.01)
*G06F 13/20* (2006.01)
*G06F 13/40* (2006.01)

(52) U.S. Cl.
CPC ........ *G06F 13/1673* (2013.01); *G06F 3/0625* (2013.01); *G06F 3/0629* (2013.01); *G06F 3/0652* (2013.01); *G06F 3/0683* (2013.01); *G06F 13/20* (2013.01); *G06F 13/4027* (2013.01); *Y02D 10/14* (2018.01); *Y02D 10/151* (2018.01)

(58) Field of Classification Search
None
See application file for complete search history.

(56) References Cited

U.S. PATENT DOCUMENTS

| 6,260,098 B1* | 7/2001 | Ku | G06F 13/405 |
| | | | 709/248 |
| 6,263,390 B1* | 7/2001 | Alasti | G06F 13/4059 |
| | | | 710/1 |
| 7,113,516 B1 | 9/2006 | Shefi et al. | |
| 7,480,303 B1* | 1/2009 | Ngai | H04L 49/351 |
| | | | 370/395.5 |
| 2012/0192038 A1* | 7/2012 | Cho | G06F 3/061 |
| | | | 714/770 |

(Continued)

FOREIGN PATENT DOCUMENTS

| EP | 0 059 799 A2 | 9/1982 |
| EP | 1 431 878 A2 | 6/2004 |
| GB | 2455744 A | 6/2009 |

OTHER PUBLICATIONS

Extended European Search Report for Patent Appln. No. 17184822.9 (dated Jan. 15, 2018).

*Primary Examiner* — Hyun Nam (57) ABSTRACT

Embodiments of a buffer device, an electronic system, and a method for operating a buffer device are disclosed. In an embodiment, a buffer device includes buffer bus connections, a peripheral bus interface connectable to a peripheral bus, a buffer memory module, and a buffer memory controller connected between the buffer bus connections, the peripheral bus interface, and the buffer memory module. Each of the buffer bus connections is connectable to a respective peripheral device. The buffer memory module comprises memory segments corresponding to the peripheral devices. The buffer memory controller is configured to control data communications between the buffer bus connections, the peripheral bus interface, and the buffer memory module.

18 Claims, 5 Drawing Sheets

(56) References Cited

U.S. PATENT DOCUMENTS

| | | | |
|---|---|---|---|
| 2013/0304990 A1* | 11/2013 | Bass | G06F 12/0835 |
| | | | 711/118 |
| 2014/0304440 A1* | 10/2014 | Barr | G06F 13/4027 |
| | | | 710/52 |
| 2016/0012001 A1* | 1/2016 | Chang | G06F 13/4022 |
| | | | 710/316 |
| 2017/0227567 A1* | 8/2017 | Son | G01B 7/30 |

* cited by examiner

BUFFER DEVICE, AN ELECTRONIC SYSTEM, AND A METHOD FOR OPERATING A BUFFER DEVICE

BACKGROUND

Peripheral devices, such as communications devices or analog-to-digital converters (ADCs), and one or more corresponding controlling devices (e.g., microcontrollers) can communicate between each other through commonly accessible memory locations. Direct-memory access (DMA) is a memory access technology in which a peripheral device can directly transfer data to/from a memory location. Typically, this memory location is part of the main system memory, which also contains program code and data. However, allowing DMA to the main system memory may have disadvantages. For example, under DMA, wrong addressing (e.g., memory area overflow or buffer overflow) can pose a potential security threat as it is possible to inject executable code into the main system memory. In addition, under DMA, the main system memory typically stays active in low-power modes, causing power consumption to increase.

SUMMARY

Embodiments of a buffer device, an electronic system, and a method for operating a buffer device are disclosed. In an embodiment, a buffer device includes buffer bus connections, a peripheral bus interface connectable to a peripheral bus, a buffer memory module, and a buffer memory controller connected between the buffer bus connections, the peripheral bus interface, and the buffer memory module. Each of the buffer bus connections is connectable to a respective peripheral device. The buffer memory module comprises memory segments corresponding to the peripheral devices. The buffer memory controller is configured to control data communications between the buffer bus connections, the peripheral bus interface, and the buffer memory module.

In an embodiment, each of the memory segments stores input data received from a different peripheral device.

In an embodiment, the buffer memory controller is further configured to block access to the peripheral bus by the peripheral devices.

In an embodiment, the buffer device and a corresponding processor connected to the peripheral bus interface are located in different power domains.

In an embodiment, the buffer memory controller is further configured to set the size of each of the memory segments in response to an instruction received through the peripheral bus interface.

In an embodiment, the buffer memory controller is further configured to perform a full wipe of a memory segment of the buffer memory module and subsequently change the size of the memory segment.

In an embodiment, the buffer memory controller is further configured to define access information of the memory segments of the buffer memory module in response to the instruction received through the peripheral bus.

In an embodiment, the buffer memory controller is further configured to define read or write access information of the memory segments of the buffer memory module in response to the instruction received through the peripheral bus.

In an embodiment, an integrated circuit (IC) device includes the buffer device.

In an embodiment, an electronic system includes peripheral devices, a peripheral bus, a buffer device, and a processor connectable to the peripheral bus. The buffer device includes buffer bus connections, a peripheral bus interface connectable to the peripheral bus, a buffer memory module, and a buffer memory controller connected between the buffer bus connections, the peripheral bus interface. Each of the buffer bus connections is connectable to a respective peripheral device of the peripheral devices. The buffer memory module comprises memory segments corresponding to the peripheral devices. The buffer memory controller is connected between the buffer bus connections, the peripheral bus interface, and configured to control data communications between the buffer bus connections, the peripheral bus interface, and the buffer memory module.

In an embodiment, each of the memory segments stores input data received from a different peripheral device.

In an embodiment, the buffer memory controller is further configured to block access to the peripheral bus by the peripheral devices.

In an embodiment, the buffer device and the processor are located in different power domains.

In an embodiment, the buffer memory controller is further configured to set the size of each of the memory segments in response to an instruction received from the processor.

In an embodiment, the buffer memory controller is further configured to perform a full wipe of a memory segment of the buffer memory module and subsequently change the size of the memory segment.

In an embodiment, the buffer memory controller is further configured to define access information of the memory segments of the buffer memory module in response to the instruction received from the processor.

In an embodiment, the buffer memory controller is further configured to define read or write access information of the memory segments of the buffer memory module in response to the instruction received from the processor.

In an embodiment, the electronic system further includes a memory device connectable to the peripheral bus.

In an embodiment, an IC device includes the electronic system.

In an embodiment, a method for operating a buffer device involves receiving input data from a peripheral device through a corresponding buffer bus connection, storing the input data at a corresponding memory segment within a buffer memory module, and allowing an authorized access of the input data through a peripheral bus interface.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
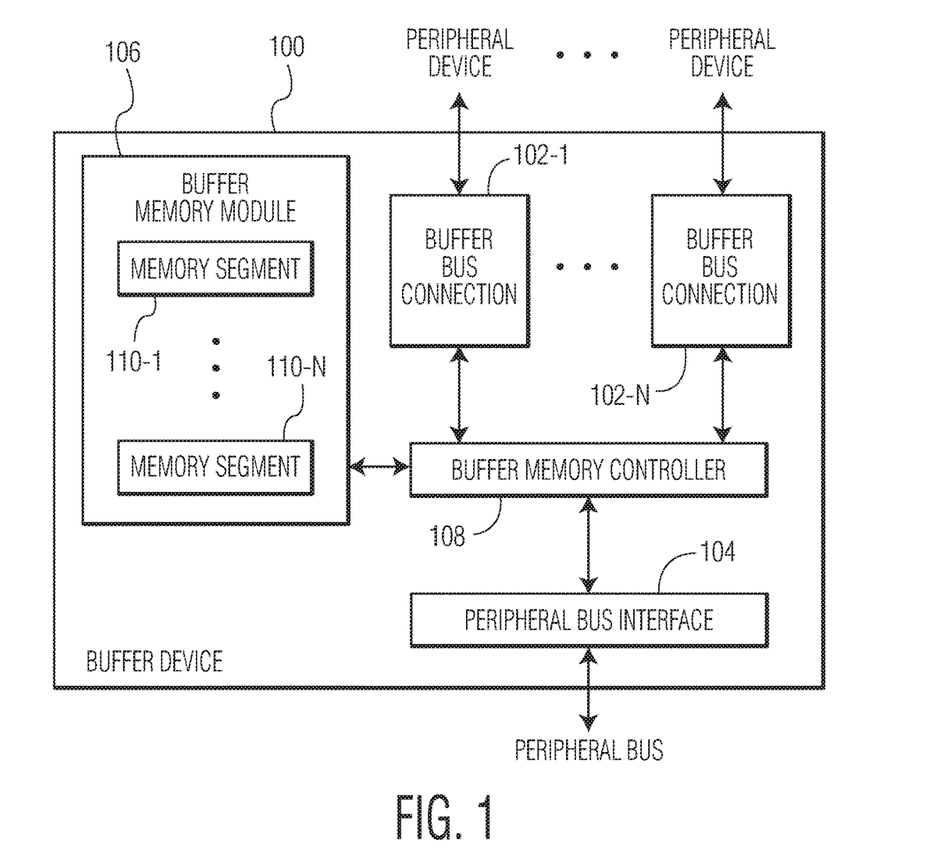
FIG. 1 depicts a buffer device in accordance with an embodiment of the invention.

FIG. 1 depicts a buffer device 100 in accordance with an embodiment of the invention. In the embodiment depicted in FIG. 1, the buffer device includes multiple buffer bus connections 102-1, . . . , 102-N (where N is a positive integer that is larger than 1), a peripheral bus interface 104, a buffer memory module 106, and a buffer memory controller 108. The buffer device may be an integrated circuit (IC) device, such as an IC module. The buffer device may be implemented in a microcontroller system. In some embodiments, the buffer device is implemented in an ADC microcontroller system. In the embodiment depicted in FIG. 1, the buffer device allows for buffering of data from, for example, communications peripheral devices or AD/DA converter peripheral devices. The buffer device is compatible with security features and ultra-low-power microcontrollers. Although the illustrated buffer device is shown with certain components and described with certain functionality herein, other embodiments of the buffer device may include fewer or more components to implement the same, less, or more functionality.

In the embodiment depicted in FIG. 1, each of the buffer bus connections 102-1, . . . , 102-N of the buffer device 100 is connectable to a respective peripheral device. Each buffer bus connection is used to communicate with a particular peripheral device. The buffer bus connections are interface devices (e.g., input/output devices) that can be implemented in hardware such as logic circuits and/or memory. The buffer bus connections may include physical connections that connect to respective buffer bus connections.

The peripheral bus interface 104 of the buffer device 100 is connectable to a peripheral bus. The peripheral bus interface is an interface device (e.g., an input/output device) that can be implemented in hardware such as logic circuits and/or memory. The peripheral bus interface may include one or more physical connections that connect to the peripheral bus. The peripheral bus can be used for communications between peripheral devices, the buffer memory module 106, and at least one control device (not shown), such as a microcontroller. In some embodiments, the peripheral devices act as slave devices and the control device acts as a master device.

The buffer memory module 106 of the buffer device 100 is used to buffer or temporarily store data for peripheral devices. The buffer memory module can be implemented using various memory technologies. For example, the buffer memory module may be a register file or a static random-access memory (SRAM). In some embodiments, the buffer memory module may be divided into memory segments 110-1, . . . , 110-N corresponding to different peripheral devices. In some embodiments, each of the memory segments stores input data received from a different peripheral device.

In the embodiment depicted in FIG. 1, the buffer memory module 106 is separate from control devices connected to the peripheral bus interface 104. Consequently, the buffer memory module and the corresponding control device can be set to different clocks or located in different power domains. Because the buffer memory module and the corresponding control device can have different clocks and/or different power supplies, the clock source and/or the power supply for the buffer memory module can be kept on while the clock source and/or the power supply for the corresponding control device is turned off. Consequently, power consumption by the corresponding control device can be reduced.

The buffer memory controller 108 of the buffer device 100 is connected between the buffer bus connections 102-1, . . . , 102-N, the peripheral bus interface 104, and the buffer memory module 106. The buffer memory controller is configured to control data communications between the buffer bus connections, the peripheral bus interface, and the buffer memory module. The buffer memory controller can be implemented in hardware such as logic circuits and/or memory. In some embodiments, the buffer memory controller is implemented as a microcontroller. In some embodiments, the buffer memory controller is further configured to block access to the peripheral bus by the peripheral devices. In some embodiments, the buffer memory controller sets the size of the memory segments 110-1, . . . , 110-N of the buffer memory module. In an embodiment, the buffer memory controller is further configured to set the size of each of the memory segments in response to an instruction received through the peripheral bus. In an embodiment, the buffer memory controller is further configured to perform a full wipe of a memory segment of the buffer memory module and subsequently change the size of the memory segment. In some embodiments, the buffer memory controller may define the access restrictions of the memory segments of the buffer memory module, including security access (e.g., read/write access) level of the memory segments of the buffer memory module, in response to an instruction received through the peripheral bus.

Figure 2:
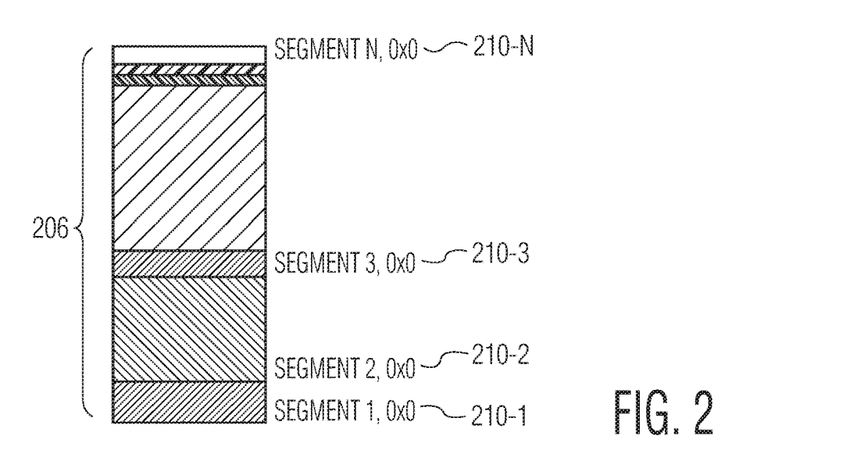
FIG. 2 depicts an embodiment of the buffer memory module of the buffer device depicted in FIG. 1.

FIG. 2 depicts an embodiment of the buffer memory module 106 of the buffer device 100 depicted in FIG. 1. In the embodiment depicted in FIG. 2, a buffer memory module 206 includes memory segments 210-1, . . . , 210-N (where N is a positive integer that is larger than 1). In an embodiment, each memory segment is a continuous portion of memory. For example, the memory segment 201-1 occupies memory space between address 0x0000 and address 0x0010, the memory segment 201-2 occupies memory space between address 0x010 to 0x0020, the memory segment 201-3 occupies memory space between address 0x020 to 0x0030, and the memory segment 201-N may occupy memory space between address 0x0N-10 to 0x00N0. However, the size of the memory segments of the buffer memory module is not limited to the examples described above. In some embodiments, the size of the memory segments of the buffer memory module is identical to each other (i.e., all of the memory segments of the buffer memory module are of the same size). In some embodiments, the sizes of the memory segments of the buffer memory module are different from each other (i.e., the size of one or more of the memory segments of the buffer memory module is different from the size of the rest of the memory segments of the buffer memory module.) The memory segments of the buffer memory module correspond to N different peripheral devices. The buffer memory module 206 depicted in FIG. 2 is one possible embodiment of the buffer memory module 106 depicted in FIG. 1. However, the buffer memory module depicted in FIG. 1 is not limited to the embodiment shown in FIG. 2.

In the embodiment depicted in FIG. 2, each memory segment 210 of the buffer memory module 206 stores input data received from a respective peripheral device. The buffer memory controller 108 (shown in FIG. 1) has access to all of the memory segments of the buffer memory module (e.g., continuous address space, starting from a base address). Each peripheral device has access to only one memory segment and addresses the memory segment relative to a respective segment base address (e.g., from 0x0 to 0xM, where M is the size of the particular memory element). Each memory segment of the buffer memory module may be configured to have cyclic (modulo) addressing. Alternatively, each memory segment of the buffer memory module may be configured to have non-cyclic addressing in which an out-of-range access results in an error condition (e.g., buffer overflow). Each memory segment of the buffer memory module may be set to be readable, writable, or readable/writable. Each pending data transaction can be marked as a secure transaction or an unsecure transaction. A secure data transaction can read/write to a secure memory segment or an unsecure memory segment while an unsecure data transaction can only read/write to an unsecure memory segment.

The buffer memory controller 108 can be used to set and adjust the properties of the memory segments 210-1, . . . , 210-N of the buffer memory module 206. In some embodiments, the buffer memory controller sets and/or changes the size of each memory segment of the buffer memory module. For example, the buffer memory controller sets each memory segment to sixteen bits. In some embodiments, the buffer memory controller performs a full wipe of a memory segment and subsequently changes the size of the memory segment. In some embodiments, the buffer memory controller sets and/or changes the access settings of the memory segments of the buffer memory module. For example, the buffer memory controller defines a set of interrupts for setting access information for the memory segments of the buffer memory module. Examples of the defined interrupts include, without being limited to, an interrupt to allow read access to a particular memory segment by a particular peripheral device, an interrupt to allow write access to a particular memory segment by peripheral, an interrupt to allow read access to one address section within a particular memory segment by a particular peripheral device, and an interrupt to allow write access to one address section within a particular memory segment by a particular peripheral device.

Figure 3:
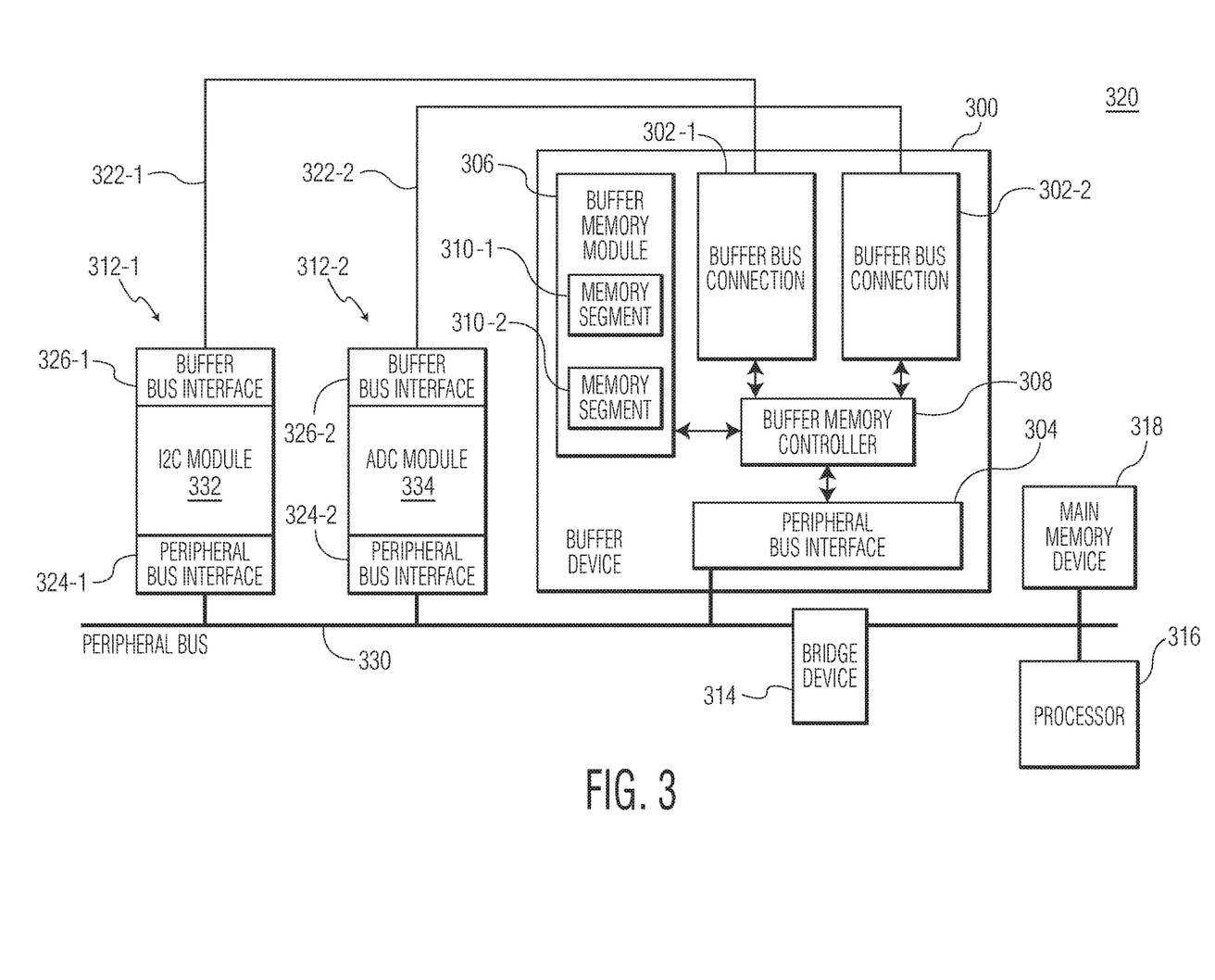
FIG. 3 depicts an embodiment of an electronic system that includes a buffer device.

FIG. 3 depicts an embodiment of an electronic system 320 that includes a buffer device 300 that is similar to the buffer device 200 described with reference to FIGS. 1 and 2. In the embodiment depicted in FIG. 3, the electronic system includes first and second peripheral devices 312-1, 321-2, the buffer device 300, a bridge device 314, a processor 316, and a main memory device 318. The electronic system may be an integrated circuit (IC) device, such as an IC module. The electronic system can be implemented in various applications. For example, the electronic system may be used in low power sensor applications as a sensor hub or an Internet of Things (IoT) node. In some embodiments, the electronic system includes an analog-to-digital converter (ADC) that captures sixty-four 16-bit samples of data, which can then be analyzed by the processor. In these embodiments, the processor instructs the buffer device to allocate a memory segment 310 of the buffer memory module 306 to the ADC and generates an interrupt when the last address within the allocated memory segment is written. The processor and the main memory device can enter a lower-power state while waiting for the interrupt so that the electronic system consumes less power while ADC data is being acquired.

In the embodiment depicted in FIG. 3, the buffer device 300 includes two buffer bus connections 302-1, 302-2, a peripheral bus interface 304, a buffer memory module 306 having two memory segments 310-1, 310-2, and a buffer memory controller 308. The buffer bus connections 302-1, 302-2, the peripheral bus interface 304, the buffer memory module 306, and the buffer memory controller 308 depicted in FIG. 3 are embodiments of the buffer bus connections 102-1, . . . , 102-N, the peripheral bus interface 104, the buffer memory module 106, and the buffer memory controller 108 depicted in FIG. 1. The buffer device 300 depicted in FIG. 3 may be similar to or the same as the buffer device 100 depicted in FIG. 1. However, the buffer device depicted in FIG. 1 is not limited to the embodiment shown in FIG. 3.

In the embodiment depicted in FIG. 3, each peripheral device 312-1 or 321-2 includes a peripheral bus interface 324-1 or 324-2 connectable to a peripheral bus 330 and a buffer bus interface 326-1 or 326-2 connectable to a respective buffer bus connection 302-1 or 302-3 of the buffer device 300 through a respective buffer bus 322-1 or 322-2. In addition, the first peripheral device 312-1 includes an Inter-Integrated Circuit (I²C) module 332 and the second peripheral device 312-2 includes an ADC module 334. Each peripheral device has only access to one memory segment 310-1 or 310-2 to prevent the peripheral device from modifying a memory segment allocated to another peripheral device. Specifically, the first peripheral device 312-1 has access to a first memory segment 310-1 but has no access to a second memory segment 310-2. The second peripheral device 312-2 has access to the second memory segment 310-2 but has no access to the first memory segment 310-2. The size and/or the access restriction (readable and/or writable by a corresponding peripheral device) of each memory segment can be dynamically adjusted by the processor 316.

The bridge device 314 is configured to control data traffic on the peripheral bus 330. In some embodiments, the bridge device is configured to transform data traffic received from the peripheral device 312-1 or 321-2 or from the buffer device 300 at a first data rate into data traffic going to the processor 316 or to the main memory device 318 at a second data rate. The second data rate may be higher than or lower than the first data rate. In some embodiments, the bridge device is configured to transform data traffic received from the processor or the main memory device at a first data rate into data traffic going to the peripheral device 312-1 or 321-2 or to the buffer device 300 at a second data rate. The second data rate may be higher than or lower than the first data rate.

The processor 316 is configured to process data received from the peripheral devices 312-1, 321-2 and/or to control the buffer device 300 and the peripheral devices 312-1, 321-2. In some embodiments, the processor may be implemented as a microcontroller. In some embodiments, the peripheral devices act as slave devices and the processor acts as a master device. The processor may set the size of the memory segments 310-1, 310-2 of the buffer memory module 306 of the buffer device. The processor may define the access restrictions of the memory segments of the buffer memory module, including security access (e.g., read/write access) level of the memory segments of the buffer memory module. The main memory device 318 is used to store data for processing.

In the electronic system 320 depicted in FIG. 3, the peripheral devices 312-1, 321-2 use the buffer device 300 for data storage and do not have direct access to the main memory device 318. Consequently, compared to a DMA system in which peripheral devices have direct access to main memories, the electronic system depicted in FIG. 3 provides better protection of the main memory device 318 against potential unauthorized access. In addition, in the electronic system depicted in FIG. 3, the peripheral devices access the buffer device through respective buffer bus connections 302-1, 302-2. Consequently, compared to a DMA system in which peripheral devices access main memories through the peripheral bus, the electronic system depicted in FIG. 3 provides compact/local memory access to peripheral devices. Further, in the electronic system depicted in FIG. 3, the buffer device can be on a different power domain from the processor 316 and the main memory device (i.e., the buffer device has a power supply that is different from the power supply of the processor and the main memory device). Compared to a DMA system in which a processor and the corresponding main memories are located in the same power domain, the electronic system depicted in FIG. 3 allows the processor and the main memory device to enter the sleep mode while keeping the buffer device powered on. Consequently, the electronic system depicted in FIG. 3 can consume less power than traditional DMA systems.

Figure 4:
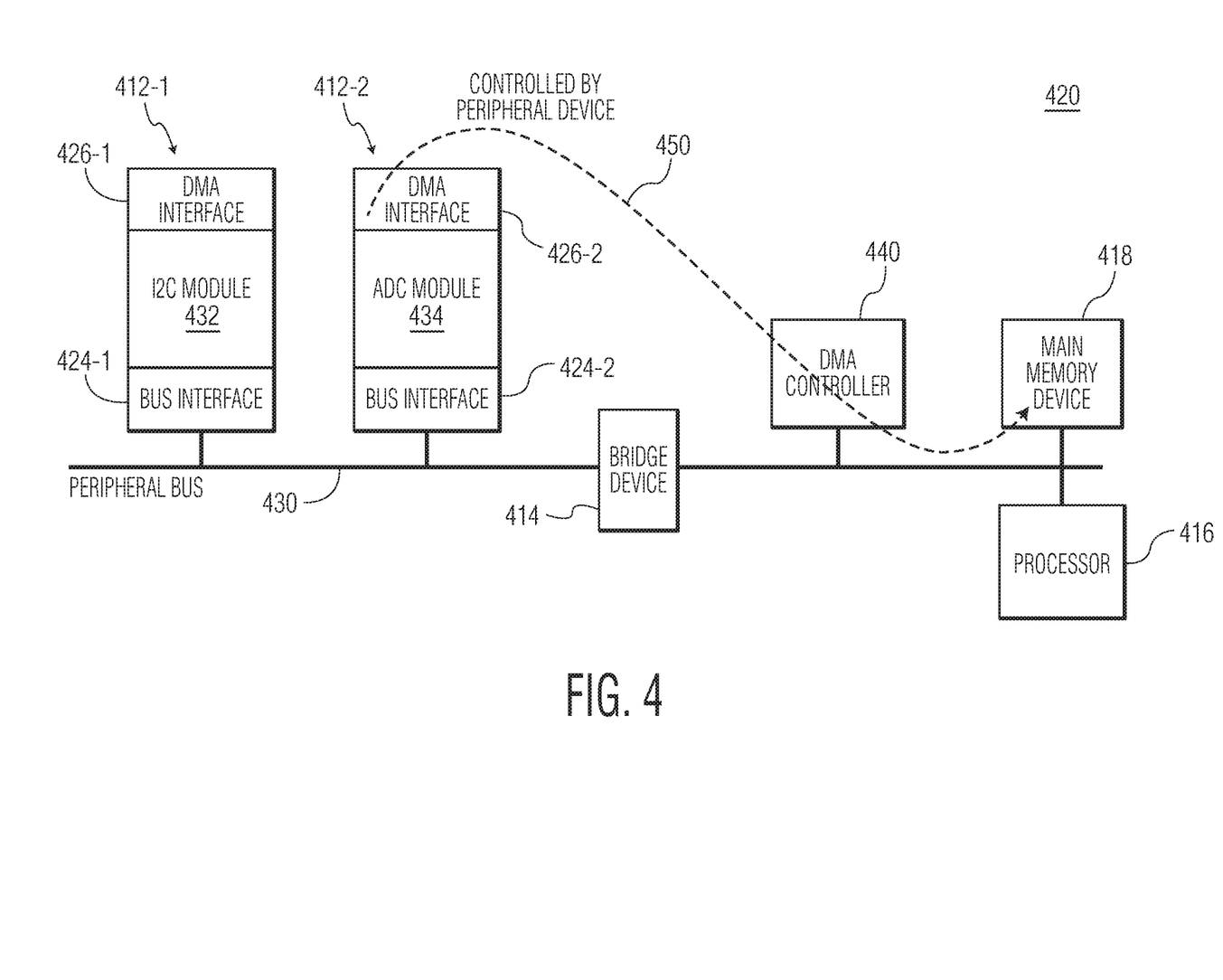
FIG. 4 depicts a DMA system that includes peripheral devices, a bridge device, a DMA controller, a processor, and a main memory device.

FIG. 4 depicts a DMA system 420 that includes first and second peripheral devices 412-1, 412-2, a bridge device 414, a DMA controller 440, a processor 416, and a main memory device 418. In the embodiment depicted in FIG. 4, each peripheral device 412-1 or 421-2 includes a bus interface 424-1 or 424-2 connectable to a peripheral bus 430 and a DMA interface 426-1 or 426-2. In addition, the first peripheral device 412-1 includes an Inter-Integrated Circuit (I²C) module 432 and the second peripheral device 312-2 includes an ADC module 434. In the DMA system depicted in FIG. 4, each peripheral device has direct access to the main memory device. Specifically, each peripheral device can transfer data from a corresponding DMA interface to the main memory device through the DMA controller in the direction as shown by the arrow 450. The DMA system depicted in FIG. 4 does not differentiate between a secure access by the processor and an unsecure access by the peripheral devices.

Figure 5:
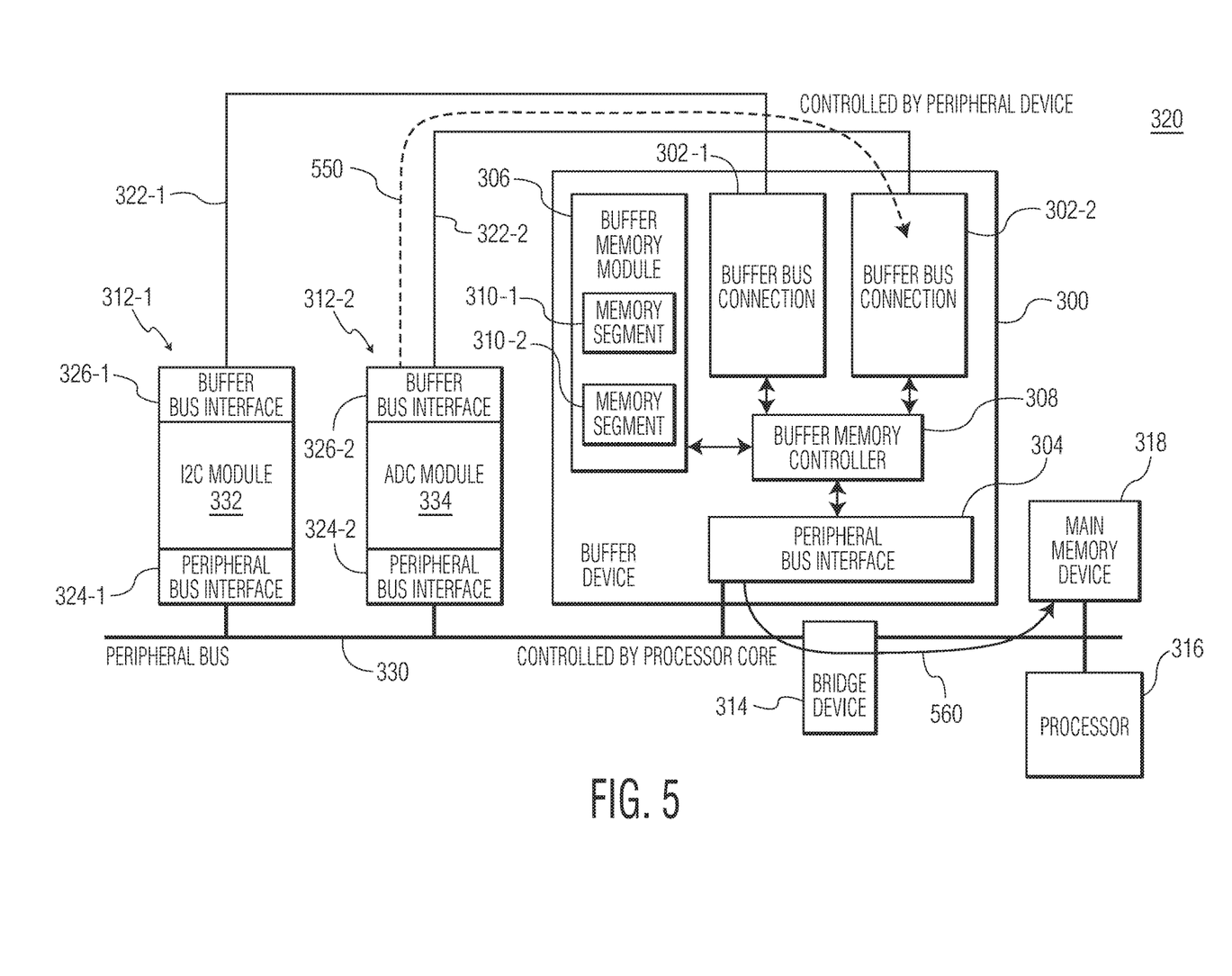
FIG. 5 illustrates a data operation of the electronic system depicted in FIG. 3.

Compared to the DMA system depicted in FIG. 4, the electronic system 320 depicted in FIG. 3 does not allow the peripheral devices 312-1, 312-2 to have direct access to the main memory device 318. The electronic system supports secure code in the processor 316 and non-secure code such as drivers or applications in the peripheral devices. The electronic system 300 can restrict access to the main memory device by potentially non-secure peripheral devices and allow secure code in the processor to control data transfers to the main memory device. FIG. 5 illustrates a data operation of the electronic system 320 depicted in FIG. 3. The peripheral device 312-2 controls the data flow from the peripheral device to the buffer device 300 in the direction as shown by the arrow 550. The memory transfer from the buffer device to the main memory device is controlled by secure code in the processor in the direction as shown by the arrow 560. Consequently, compared to the DMA system depicted in FIG. 4, the electronic system depicted in FIG. 3 is more robust against potential unauthorized access from non-secure peripheral devices.

Figure 6:
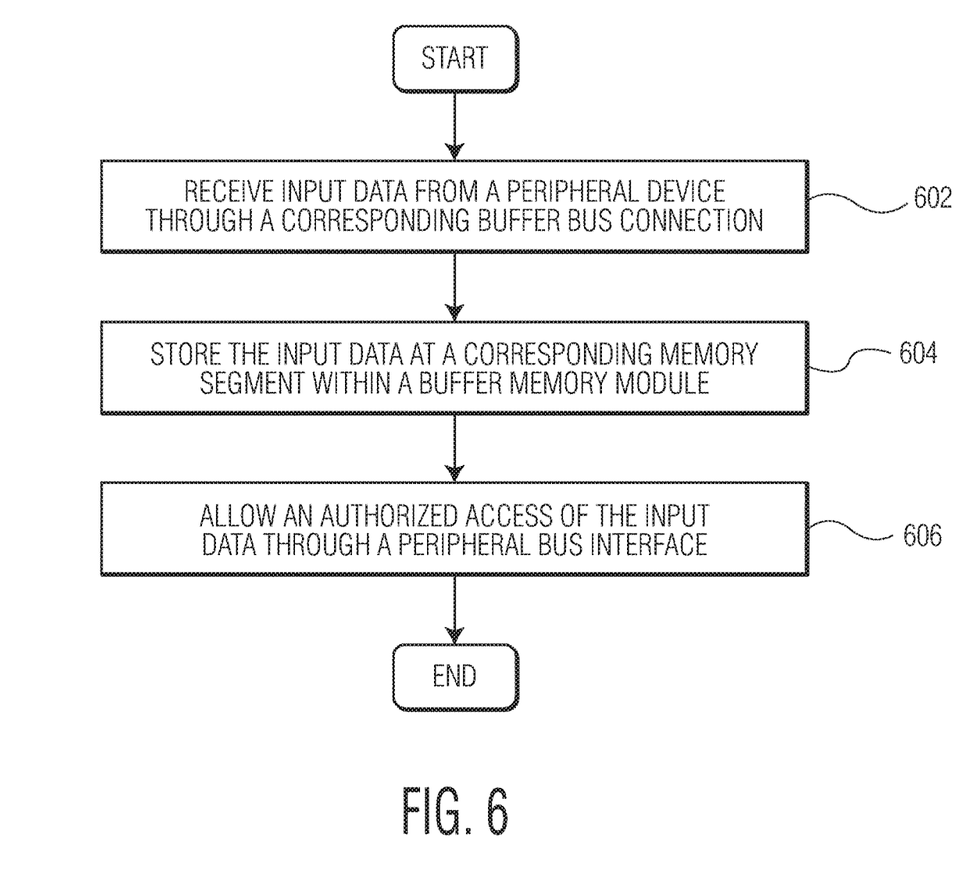
FIG. 6 is a process flow diagram of a method for operating a buffer device in accordance with an embodiment of the invention.

FIG. 6 is a process flow diagram of a method for operating a buffer device in accordance with an embodiment of the invention. At block 602, input data is received from a peripheral device through a corresponding buffer bus connection. At block 604, the input data is stored at a corresponding memory segment within a buffer memory module. At block 606, an authorized access of the input data through a peripheral bus interface is allowed. The buffer device may be the same or similar to the buffer device 106 depicted in FIG. 1 and/or the buffer device 206 depicted in FIG. 2.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A buffer device, the buffer device comprising:
    a plurality of buffer bus connections, wherein each of the buffer bus connections is configured to connect to a respective peripheral device;
    a peripheral bus interface configured to connect to a peripheral bus;
    a buffer memory module, wherein the buffer memory module comprises memory segments corresponding to the peripheral devices, wherein each of the memory segments stores input data received from a different peripheral device; and
    a buffer memory controller connected between the buffer bus connections, the peripheral bus interface, and the buffer memory module and configured to control data communications between the buffer bus connections, the peripheral bus interface, and the buffer memory module.

2. The buffer device of claim 1, wherein the buffer memory controller is further configured to block access to the peripheral bus by the peripheral devices.

3. The buffer device of claim 1, wherein the buffer device and a corresponding processor connected to the peripheral bus interface are located in different power domains.

4. The buffer device of claim 1, wherein the buffer memory controller is further configured to set the size of each of the memory segments in response to an instruction received through the peripheral bus interface.

5. The buffer device of claim 4, wherein the buffer memory controller is further configured to perform a full wipe of a memory segment of the buffer memory module and subsequently change the size of the memory segment.

6. The buffer device of claim 4, wherein the buffer memory controller is further configured to define access information of the memory segments of the buffer memory module in response to the instruction received through the peripheral bus.

7. The buffer device of claim 6, wherein the buffer memory controller is further configured to define read or write access information of the memory segments of the buffer memory module in response to the instruction received through the peripheral bus.

8. An integrated circuit (IC) device comprising the buffer device of claim 1.

9. An electronic system, the electronic system comprising:
    a plurality of peripheral devices;
    a peripheral bus;
    a buffer device, the buffer device comprising:
        a plurality of buffer bus connections, wherein each of the buffer bus connections is configured to connect to a respective peripheral device of the peripheral devices;
        a peripheral bus interface configured to connect to the peripheral bus;
        a buffer memory module, wherein the buffer memory module comprises memory segments corresponding to the peripheral devices, wherein each of the memory segments stores input data received from a different peripheral device; and
        a buffer memory controller connected between the buffer bus connections, the peripheral bus interface, and the buffer memory module and configured to control data communications between the buffer bus connections, the peripheral bus interface, and the buffer memory module; and
    a processor configured to connect to the peripheral bus.

10. The electronic system of claim 9, wherein the buffer memory controller is further configured to block access to the peripheral bus by the peripheral devices.

11. The electronic system of claim 9, wherein the buffer device and the processor are located in different power domains.

12. The electronic system of claim 9, wherein the buffer memory controller is further configured to set the size of each of the memory segments in response to an instruction received from the processor.

13. The electronic system of claim 12, wherein the buffer memory controller is further configured to perform a full wipe of a memory segment of the buffer memory module and subsequently change the size of the memory segment.

14. The electronic system of claim 12, wherein the buffer memory controller is further configured to define access information of the memory segments of the buffer memory module in response to the instruction received from the processor.

15. The electronic system of claim 14, wherein the buffer memory controller is further configured to define read or write access information of the memory segments of the buffer memory module in response to the instruction received from the processor.

16. The electronic system of claim 9, further comprising a memory device connectable to the peripheral bus.

17. An integrated circuit (IC) device comprising the electronic system of claim 9.

18. A method for operating a buffer device, the method comprising:
    receiving input data from a peripheral device of a plurality of peripheral devices through a corresponding buffer bus connection of a plurality of buffer bus connections, wherein each buffer bus connection of the plurality corresponds to a respective peripheral device of the plurality of peripheral devices;
    storing the input data at a corresponding memory segment within a buffer memory module, wherein the memory segment is of a plurality of memory segments each for storing input data from a different peripheral device of the plurality of peripheral devices,
    wherein an authorized access of the input data by a processor is allowed through a peripheral bus interface;
    controlling by a buffer memory controller, data communications between the plurality of buffer bus connections, a peripheral bus interface, and the buffer memory module.

* * * * *